United States Patent [19]

Sletten et al.

[11] 4,307,709

[45] Dec. 29, 1981

[54] INTERNAL ABSORBER SOLAR COLLECTOR

[76] Inventors: Carlyle J. Sletten, 106 Nagog Hill Rd.; Sheldon B. Herskovitz, 88 Hammond St., both of Acton, Mass. 01720; F. S. Holt, 46 Emerson Rd., Winchester, Mass. 01890; E. J. Sletten, Chestnut Hill Rd. R.F.D. Rte. #4, Amherst, N.H. 03031

[21] Appl. No.: 112,953

[22] Filed: Jan. 17, 1980

[51] Int. Cl.³ .................................................. F24J 3/02
[52] U.S. Cl. .................................. 126/440; 126/417; 126/438
[58] Field of Search ............... 126/440, 439, 438, 432, 126/417; 350/433

[56] References Cited

U.S. PATENT DOCUMENTS

| 1,989,999 | 2/1935 | Niederle | 126/440 |
|---|---|---|---|
| 3,125,091 | 3/1964 | Sleeper, Jr. | 126/440 |
| 3,529,117 | 9/1970 | Costello | 350/433 X |
| 4,058,110 | 11/1977 | Holt | 126/440 |
| 4,068,474 | 1/1978 | Dimitroff | 126/438 |
| 4,069,812 | 1/1978 | O'Neill | 126/438 |
| 4,136,673 | 1/1979 | Escher | 126/438 |
| 4,156,420 | 5/1979 | Gunderson | 126/438 |
| 4,171,695 | 10/1979 | Sletten | 126/438 |
| 4,190,036 | 2/1980 | Niedermeyer | 126/439 |
| 4,234,354 | 11/1980 | Lidorenko et al. | 126/439 |

Primary Examiner—Larry Jones

[57] ABSTRACT

Thin solar collecting panels are described made from arrays of small rod collectors consisting of a refracting dielectric rod lens with an absorber imbedded within it and a reflecting mirror coated on the back side of the dielectric rod. Non-tracking collector panels on vertical walls or roof tops receive approximately 90% of solar radiation within an acceptance zone 60° in elevation angle by 120° or more in the azimuth sectors with a collector concentration ratio of approximately 3.0. Miniaturized construction of the circular dielectric rods with internal absorbers reduces the weight per area of glass, plastic and metal used in the collector panels. No external parts or insulation are needed as heat losses are low due to partial vacuum or low conductivity gas surrounding heated portions of the collector. The miniature internal absorbers are generally made of solid copper with black selective surface and the collected solar heat is extracted at the collector ends by thermal conductivity along the absorber rods. Heat is removed from end fittings by use of liquid circulants. Several alternate constructions are provided for simplifying collector panel fabrication and for preventing the thermal expansion and contraction of the heated absorber or circulant tubes from damaging vacuum seals. In a modified version of the internal absorber collector, oil with temperature dependent viscosity is pumped through a segmented absorber which is now composed of closely spaced insulated metal tubes. In this way the circulant is automatically diverted through heated portions of the absorber giving higher collector concentration ratios than theoretically possible for an unsegmented absorber.

13 Claims, 16 Drawing Figures

INTERNAL ABSORBER SOLAR COLLECTOR

The United States Government has rights in this invention pursuant to Grant Number DE-FG04-77CS34163, awarded by the U.S. Department of Energy.

BACKGROUND

Heretofore apparatus for concentrating and collecting solar energy generally have consisted of lenses, reflectors and absorbers as separate components which are geometrically and mechanically positioned to form a solar collector with, for example, high concentration ratios and/or low thermal losses. This separation of collector components as typified by U.S. Pat. Nos. 4,058,110, 4,068,474 and 4,069,812, results in relatively deep thick structure and adds to the cost of making solar collectors. These collectors are also provided with tracking equipments needed for mechanically following the angular motions of the sun, which tracking mechanisms add substantially to the cost of collecting solar energy.

In order to obtain a relatively high concentration of radiant solar energy without tracking motions, which concentration is desirable to increase operating temperatures and to reduce the area of the absorber portions of solar collectors, wide-angle optics is necessary. U.S. Pat. No. 4,171,695 and U.S. Pat. No. 4,002,499 provide technology for non-tracking solar collectors with moderate concentration ratios. However, these collectors are thick requiring considerable depth for individual collectors and panels of these collectors. Thin collectors without external insulation making up thin panels offer great cost and space savings. Also the prior art cited describes collectors with elevation angle coverage divided equally about the normal to the aperture plane of the collector. This symmetry restricts the orientation of the collectors for full coverage to tilts with the vertical of approximately equal to the latitude angle of the location of the collector. It is often advantageous to mount collectors on vertical walls of buildings and still obtain the 60° elevation angle coverage needed for tracking annular angular motion of the sun. Even though vertical wall installations result in smaller average projected area of the collector wall mountings are easier to keep free of snow and dirt and eliminate cutting holes in roofs.

The extraction of heat from solar absorbers is generally accomplished by circulating liquids or gases through them. These techniques for removing the heat collected often suffer from leaks, corrosion, freezing, poor heat transfer from absorber to circulant and the added cost of pumping circulant through the collector absorbers.

It is well known that solar collector lenses may focus and concentrate solar energy well in one plane, say the elevation plane, defined from a point on the horizon to the zenith, while the azimuth plane focusing may deteriorate badly during the early morning and late evening hours. Furthermore, optical losses are increased as lens' thickness is increased or the number of reflections on lens or reflector surfaces is increased.

Therefore, there is a need for a non-tracking solar collector that concentrates the sun's radiant energy over the wide elevation and azimuth angular interval traversed daily and annually by the sun with a collecting structure that is very thin, that can be wall or roof mounted, and that extracts heat efficiently without absorber circulants. The new collector described below has these and other beneficial characteristics. Furthermore, being easy to construct by miniaturized extrusion fabrication and having no external portions to position, additional cost advantages are realized with internal absorber solar collectors.

SUMMARY

We, the inventors, have devised a new internal absorber solar collector that incorporates a shaped absorber portion within a wide-angle rod lens with a mirrored back surface. Each individual collector element can be composed of a circularly cylindrical dielectric rod with an internal portion of the dielectric material removed into which space a shaped blackened metal portion is located and separated from the surrounding dielectric material by a region filled by a partial vacuum or by a gas with low heat conductivity. These rod collectors can have small diameters ranging from a few millimeters to 20 centimeters or more, and the individual internal absorber solar collector elements are arrayed in panels composed of rods attached side by side. The solar panels are usually deployed with rod axes along an East-West line facing the southern sky in the northern hemisphere.

Because the optical concentrator portions of the collector make use of the refractive properties of the dielectric lens together with the concentrating characteristics of the curved rear mirror, the sun's energy is focused onto the shaped blackened absorber portion over an acceptance angle of about 60° in the elevation plane and ±60° in azimuth planes. Nearly 100% of the direct and diffused solar radiation in this angular interval is received by the absorber which means the collector is highly efficient over the entire year without reorientation or movement.

The volume to width ratio of a circular rod varies with the rod radius. That is, the projected surface area to the sun of an East-West oriented rod is proportional to the rod radius while the rod's volume and weight are proportional to the radius squared. Therefore, to construct a collector with the least material or weight for a given aperture area, very thin rods are best. Scaling down the rod radius of the collector in this way doesn't affect its concentration ratio although the smaller radii reduce the optical losses due to light propagation through the rod lens. In order to realize the benefits of lower weight and material costs and lower optical propagation losses, the dimensions of the blackened absorber also must be scaled down. The miniaturization of the absorber cross-section makes it more difficult to pump liquids or gas through the absorber to remove collected heat. However, the heat can be efficiently removed to the ends of the rod collectors using absorbers composed of high conductivity metals coated with an optically black, selective layer such as black chrome.

When the blackened arc-like shaped absorber is about ⅓ the width of the dielectric rod's diameter, a collector concentration ratio of about 3 results. To attain higher concentration ratios the absorber can be segmented into smaller portions and insulated from each other except at the ends of the absorber. An automatic switch causing heat to be removed principally from solar illuminated portions of the absorber can be constructed by circulating oil with temperature dependent viscosity through the interior of the segmented absorber. With equal oil pressure on all segments of the absorber at one end of the collector the flow will be greatest in the solar heated segments resulting in higher collector operating temperatures. With this modification to the collector larger rod diameters must be used to allow oil to circulate freely through segments of the absorber resulting in heavier and thicker collectors and collector panels. Therefore, the preferred absorber configuration avoids circulants through the absorber and uses, instead, heat conduction through metals for heat extraction.

Because the elevation plane acceptance angle for the internal absorber rod collector can be greater than 90° and because elevation coverage sectors need not be symmetrically or equally disposed about the normal to a panel of rod collectors, the solar collectors to be described herein can be mounted either on vertical walls or inclined from the zenith on roof top installations.

To obtian the desired collector output of high temperature heat and, at the same time, maintain low heat losses, the shaped blackened absorber can be insulated to prevent conduction and convection losses. In order to eliminate problems caused by the thermal expansion and contraction of metal absorbers, special apparatus is provided. The heat collected by the shaped absorbers is removed at the collector rod ends and transported by circulating fluids or other means to be used for heating and cooling buildings, steam generation, or other applications.

A primary object of the invention, then, is to produce optically and thermally efficient solar collector panels with absorber internal to rod shaped refracting lenses mirrored on the rear surface such that no portions are affixed or positioned outside the rod shaped collector and such that scaled, miniature members of the collector can be constructed by the extrusion of metals, glass or plastics.

A further object of the invention is to provide very wide acceptance angle coverage in both elevation and azimuth angle planes with a fixed mounted, non-tracking concentrating solar collector and collector panels.

A still further object of the invention is to provide a means for efficiently removing heat at relatively high temperatures from a solar absorber by use of heat conduction in metals and without using liquid or gaseous circulants.

Another object of the invention is to produce higher collector concentration ratios by segmenting the collector's absorber into insulated portions and removing the heat collected by circulating oils with temperature dependent viscosity which automatically flow primarily through the illuminated and heated portions of the absorber.

Yet another object of the invention is to prevent breakage of gas or vacuum seals due to thermal expansion or contraction of collector or panel members by use of special apparatus which functions to remove the heat from the collector panels.

These and further objects of the invention will become apparent upon referring to the detailed description following, the appended claims, and by referring to the accompanying drawings.

DESCRIPTION OF THE PREFERRED EMBODIMENT

Figure 1:
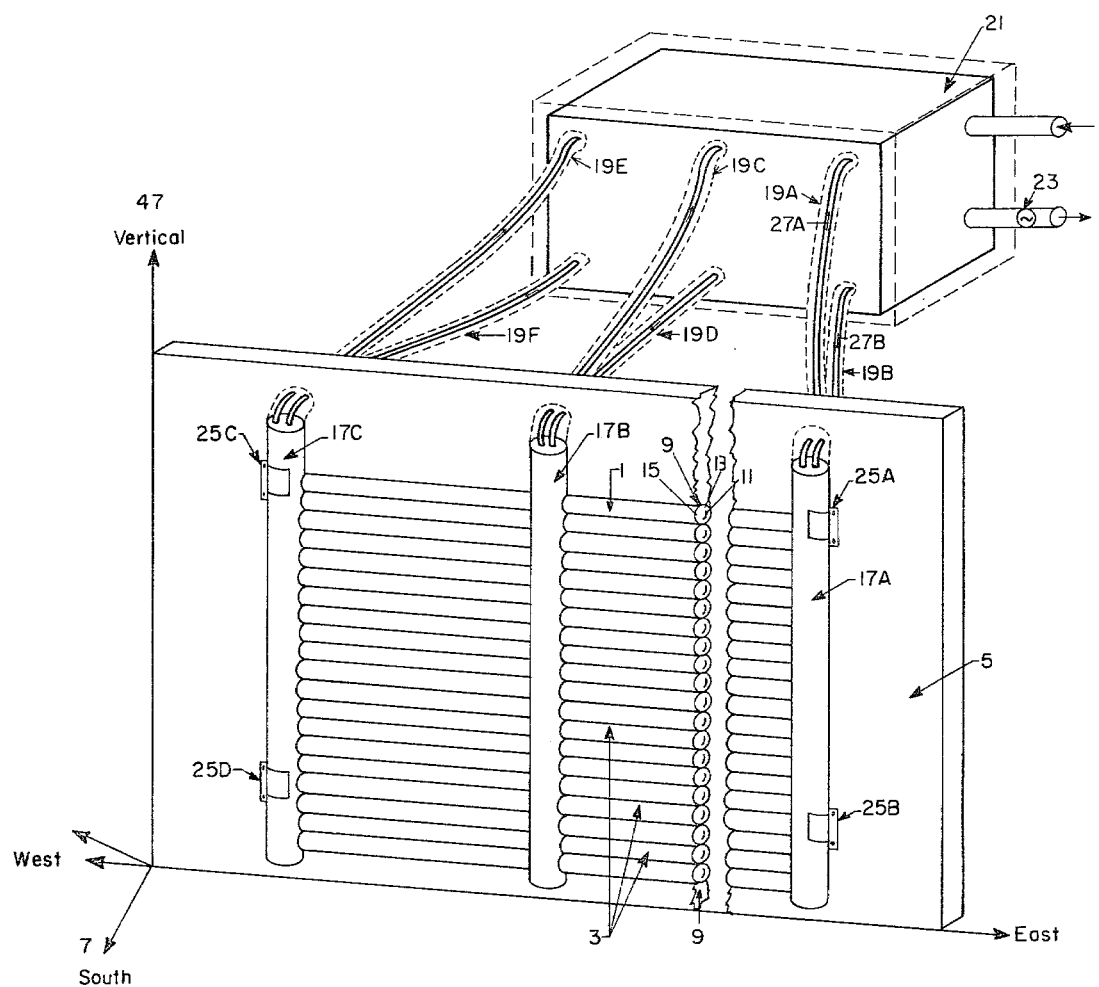
FIG. 1 is a perspective view of the solar collectors mounted in a panel array on a vertical wall with a cutaway cross-section to show the dielectric rod lens and internal absorber.

Referring now to the drawings wherein like referenced numerals or letters designate identical or corresponding parts throughout the several views and more particularly to FIG. 1 where is shown a perspective view of an internal absorber collector 1 arrayed side by side in a panel 3 of similar collectors mounted on a vertical wall 5 facing generally in a southernly direction indicated by the arrow 7 for the purpose of concentrating and collecting solar energy. In the cut-away section 9 of FIG. 1, and in more detail in FIG. 2, the collector 1 is seen in cross-section to be rod shaped and circular in exterior form and to contain a crescent shaped absorber 11 shown darkly shaped surrounded by an evacuated or gas filled region 13 which is in turn surrounded by a dielectric rod lens portion 15. At each end of the collector and collect panel shown in FIG. 1 are end fittings 17A, B, C which contain other tubes and apparatus to be described later. The solar energy collected by the collector is conveyed to an insulated reservoir 21 by means of liquids flowing in the thermally insulated tubes 19A, B, C, D, E, and F. The reservoir 21 usually contains a heated liquid which is pumped when needed by pump 23 to buildings for use in heating and cooling applications. Although in the installation shown in FIG. 1 a liquid circulant will flow by action of gravity through the tubes 19A, B, C, D, E, and F to and from the reservoir 21 in the directions indicated by arrows 27A and 27B pumps may also be installed in the tubes 19A, C, E to permit the reservoir 21 to be located below the collector panel 3.

Figure 2:
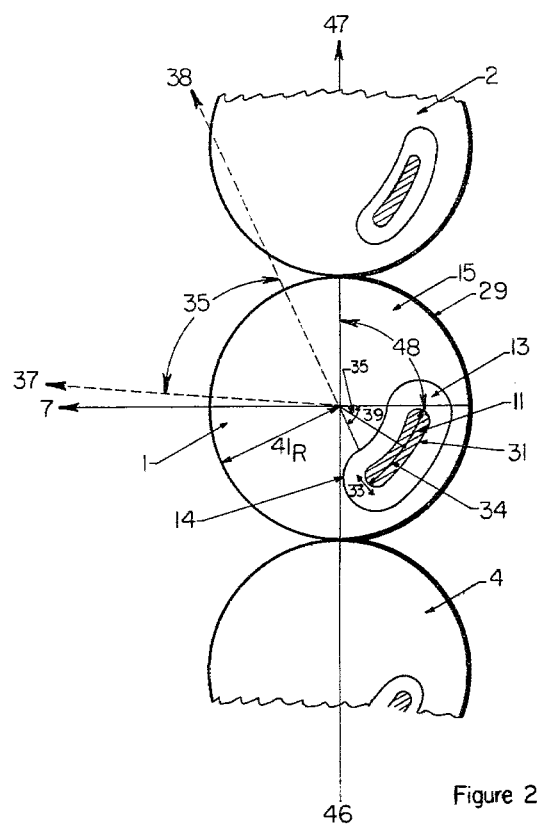
FIG. 2 is an enlarged cross-sectional view through the collectors showing orientation of shaped internal absorber when collector panel is mounted on a vertical wall.

Referring again to FIG. 2, we see in the enlarged cross-sectional view collector 1 with similar contiguous collectors 2 and 4 as positioned with respect to each other in a panel for mounting on a vertical wall. Shown also in FIG. 2 is the rear mirror 29 which is generally circular in form and consists of a reflecting metal film adhering to the back surface of the dielectric rod lens 15. Rear mirror 29 together with the dielectric rod lens 15 serve to direct the sun's radiant energy onto the blackened crescent shaped absorber 11 which is usually composed of solid metal such as copper and covered on its exterior surface 31 with a thin selectively absorbing layer such as black chrome. The thickness 33 of the absorber 11 is made as large as space will allow in order to improve heat conduction toward the collector ends and end fittings. Greater and more rapid heat conduction reduces the temperature differences along the surface of the absorber 11 and, therefore, reduces loss of heat due to infra-red radiation from the absorber. Likewise, the gap 13 which is generally filled with a partial vacuum is made as large as space within the rod shaped collector will allow in order to reduce conduction and convection loss of heat across the gap 13. When, for example, in the middle latitudes of the Northern Hemisphere the elevation angle coverage section ranges from 10° above the Southern horizon direction 7 as indicated by arrow 37 to approximately 70° above the horizon as indicated by arrow 38, then the elevation acceptance angular sector 35 will be approximately 60° and the corresponding absorber arc width 35. The absorber arc 35 together with the absorber arc radius 39 determine the width dimension 34 of the absorber 11. The radius of the absorber 39 is usually about 0.65 the radius R, 41, of the dielectric rod lens. The radius R, 41, of the dielectric rod lens is generally made as small as practical in order to reduce the collector thickness which is the rod diameter, 2R. Theoretical relationships between dimensions of the absorber and heat loss, temperature rises, collector efficiencies, etc. will be described in later sections of the specifications.

Figure 3:
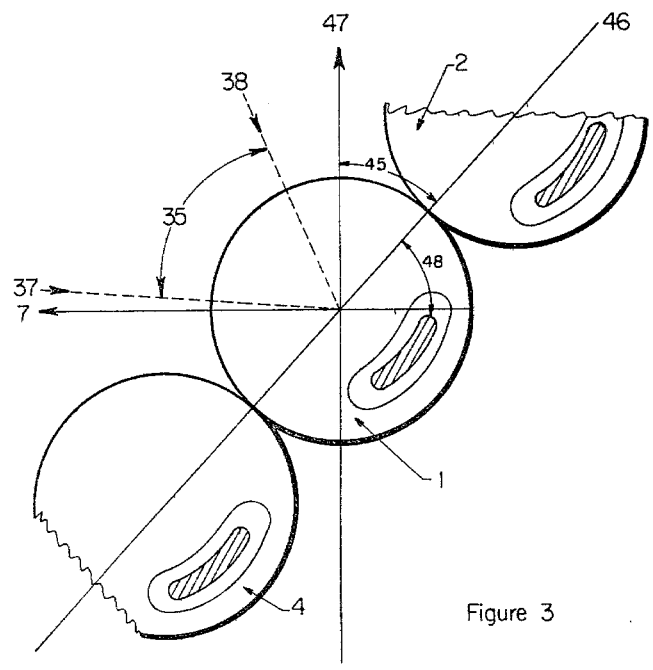
FIG. 3 is an enlarged cross-sectional view through the collectors showing orientation of shaped internal absorber when collector panel is mounted on a roof-top or a flat surface.

In the enlarged cross-sectional view of FIG. 3 is shown a typical orientation of an individual collector 1 assembled into a panel with neighboring collectors 2 and 4 when the collector panel is mounted on a roof. Now the aperture plane of the panel 46 is tilted by the angle 45 with the vertical direction indicated by the arrow 47. Tilting the solar panel such that the angle 45 is equal to the co-latitude angle increases the effective collecting area of the collector but generally results in more costly installations and in difficulties with snow loading and dirt accumulation. The only difference in the construction of collector panels for vertical mounting or tilted mountings on roofs or flat surfaces is an angular rotation of the collector rods changing the angular interval 48 as shown in FIG. 2 and FIG. 3, the angle 48 being less for the roof mounted panel. Thus the same collector 1 can be used for all latitudes and mounting surfaces with only the angle 48 being rotated appropriately when the panels are formed by attaching the collector rods in their side by side configuration and rear mirror surface 29 adjusted to cover the back portions of the collector only.

The operating principals of the collector for obtaining high optical and thermal efficiencies are described with the aid of FIGS. 4, 5, 6A, 6B, 7, and Table 1. It will be first shown by ray tracing through the collector that nearly all the direct and diffuse radiation from the sun in an acceptance angular interval of 60° in the elevation plane and 120°, that is plus or minus 60°, in azimuth planes are intercepted by the internal absorber.

Figure 4:
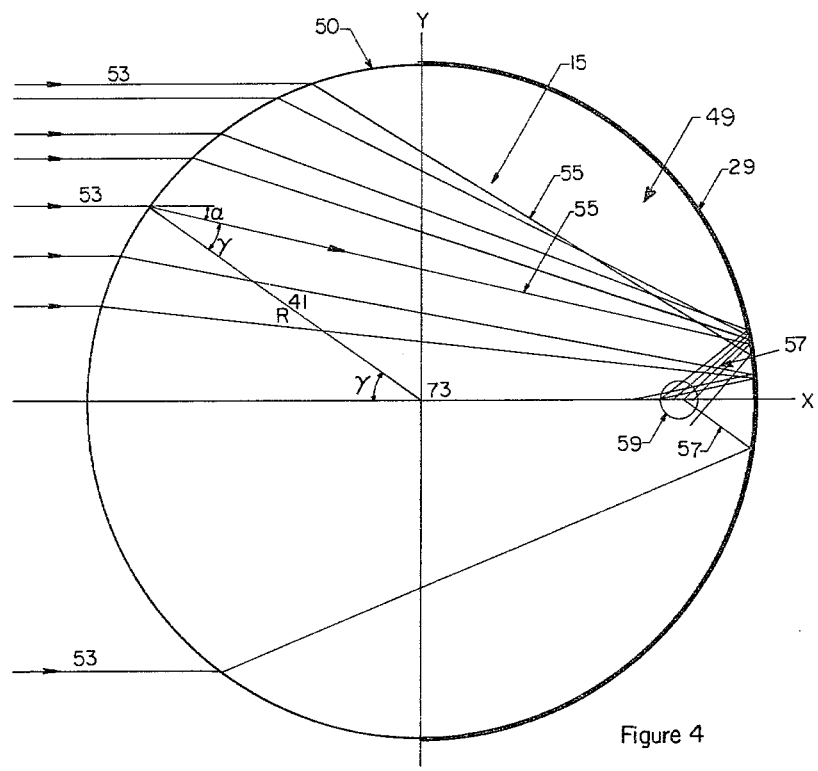
FIG. 4 is an enlarged cross-sectional view dielectric rod lens and circular rear mirror showing sun's rays focused to small circle when rod axis is oriented normal to the sun's direction.

Refer now to FIG. 4 wherein an enlarged cross-section of a dielectric rod lens 15 is shown with the back semicircle of the lens covered by the rear mirror acting as a reflecting subreflector. Representative rays of radiant solar energy 53 are shown incident on the front semicircle surface 50 of the rod lens. The incident rays are assumed to be normal to the axis of the rod lens which axis proceeds in and out of the drawing through the center 73 of the rod lens. The rod axis is also assumed to lie along an East-West line. Then such normal solar incidence will occur at noon time which is here defined as the condition of zero azimuth incidence. Azimuth angle inclination will be, therefore, non-zero during the morning and afternoon hours. Elevation angle incidence of solar rays will also vary daily and seasonally but will generally remain within the 60° angular interval 35 shown in FIG. 2 and FIG. 3. When azimuth angle incidence is zero the tracing of rays as shown in FIG. 4 through the rod lens 15 and from the rear mirror 29 is a well known two dimensional problem in optics. The family of incident parallel rays 53 are refracted at the lens interface 50 according to Snell's Law of Refraction and proceed along straight line trajectories as rays 55 inclined by angles α from the incident ray 53 directions. Rays 55 propagate toward the rear mirror 29 where they are reflected according to Snell's Law of Reflection as rays 57. When the rear mirror is circular and, for the example shown, the index of refraction of the lens is 1.523 the reflected rays tend to be focused to a region within the circle 59. The center of the circle 59 of ray convergence is located at a distance approximately 0.79R from the center 73 of the dielectric rod lens 49 where R is the rod lens radius 41.

Figure 5:
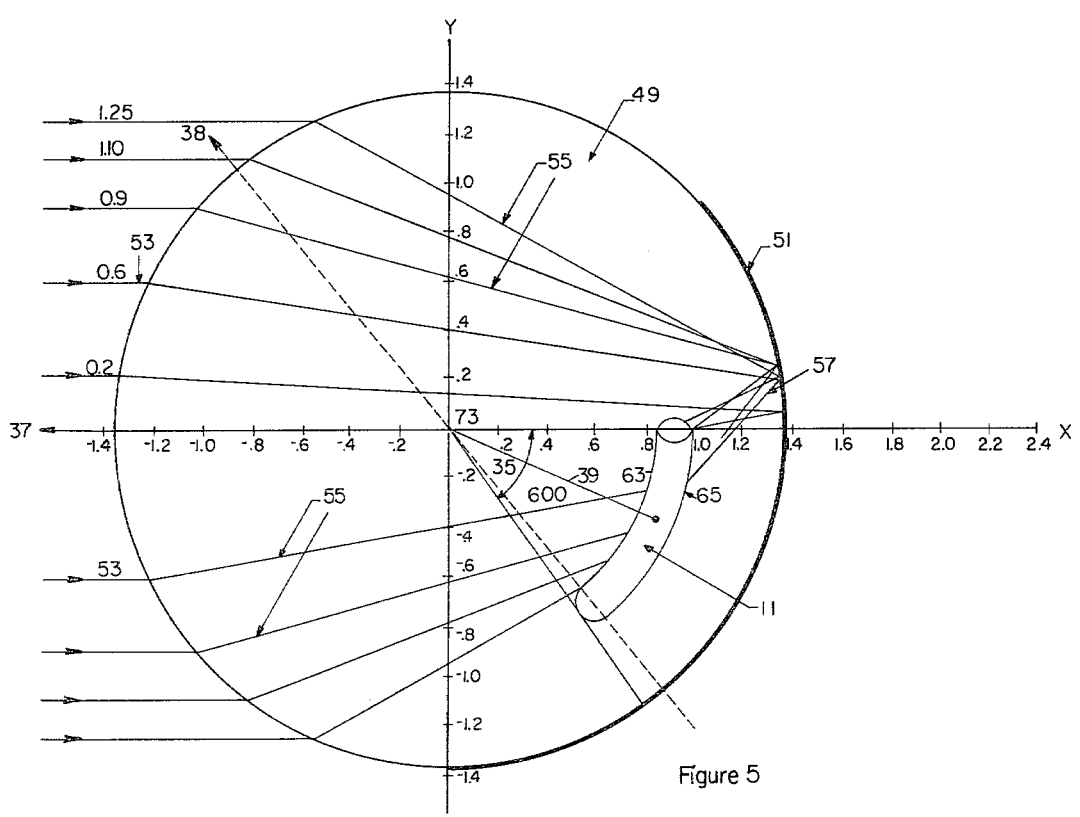
FIG. 5 is an enlarged cross-sectional view of the collector with shaped internal absorber portion intercepting the sun's rays at the lowest sun elevation angle of the acceptance interval and at zero azimuth angle incidence.

In order to construct an absorber that will intercept all the incident solar rays over an elevation plane acceptance angle interval of 60° an absorber 11, as shown in FIG. 5, can be formed in an arc or crescent. Again the rays 55 and 57 traced in FIG. 5 are for zero elevation and zero azimuth angle incidence, but now the absorber 11 is extended to intercept both the refracted and reflected rays incident over the 60° elevation angle acceptance interval 35. To increase the collector's concentration ratio the absorber 11 is positioned closer to the center 73 of the dielectric rod lens such that the radius 39 to the center of the absorber 11 is now approximately 0.65R instead of at 0.79R as was the distance to the center of the circle of convergence 59 of FIG. 4. This shorter radius 39 is possible without missing rays because the absorber 11 is an extended structure and the reflected rays 57 from the zero elevation edge condition will strike the back surface 65 of the absorber 11.

Many of the refracted rays 55 are incident directly on the front surface 63 of absorber 11 while the reflected rays 57 tend to be reflected onto the back surface 65. For solar incidence between 0° and 60° in elevation angles more rays are intercepted by the front surface 63 of the absorber 11 than the back side 65. At both edge conditions of elevation incidence 37 and 38, namely zero degrees and 60° in elevation angles, the ray diagram shown in FIGS. 4 and 5 are appropriate due to the circular symmetry of the dielectric rod lens 49 and the rear mirror 51. The number 51 indicates that the semicircular mirror 29 has been truncated. Thus, only one elevational angle edge condition of ray tracing needs to be shown. Also, these edge condition ray trajectories determine the location of the absorber for maximum optical efficiency within the given acceptance angle intervals in the azimuth and elevation coverage sectors. During the middle portions of the elevation interval 35 all rays generally converge to the absorber 11.

To find the ray trajectories within the internal absorber rod collector when the solar radiation is not incident at zero degrees azimuth angle and to find the location and shape of the absorber that will intercept greater than 90% of the rays in the ±60° azimuth angle acceptance interval require a more complicated ray analysis than is needed for the two dimensional geometry applicable for the zero azimuth angle incidence condition already described. The necessary optical calculations are now discussed with the aid of FIG. 6A and FIG. 6B.

Figure 6A:
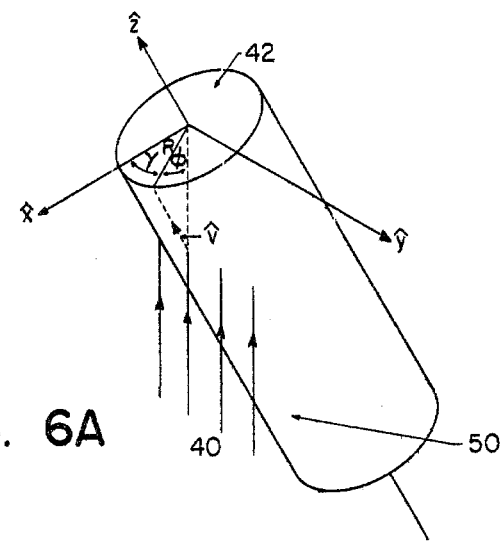
FIG. 6A establishes coordinate frame for ray tracing azimuth incident rays.
Figure 6B:
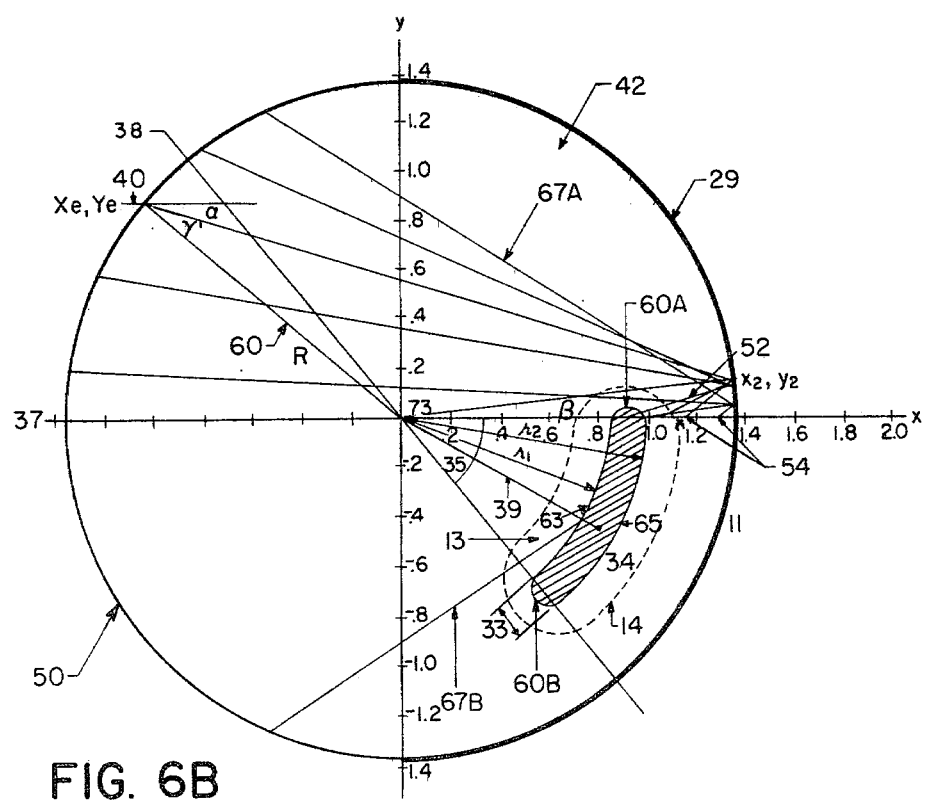
FIG. 6B is an enlarged cross-sectional view of the collector with the shaped internal absorber portion intercepting the sun's rays at the lowest elevation angle and at 30° azimuth angle incidence.

A parallel bundle of rays 40 is shown incident on a dielectric rod lens 42 of radius R in FIG. 6A. If the azimuth angle of incidence as shown is designated by the symbol $\phi$ and the rectangular coordinates x, y and z designate the point of intersection of each incident ray in the bundle 40 with the dielectric rod surface, a right circular cylinder, with z being directed along the rod axis, then we can conveniently define cylindrical coordinates, R, $\gamma$ and z to describe ray trajectories within the circular dielectric rod lens 42. The rays 67A,B internal to the rod lens 42 are defined by means of the unit vector $$\hat{v} = v1\hat{x} + v2\hat{y} - v3\hat{z}$$

where $\hat{x}$, $\hat{y}$ and $\hat{z}$ are unit vectors in the direction of the coordinate axes x, y, and z as shown in FIG. 6A and $v_1$, $v_2$, and $v_3$ are components of rays 67A, B shown in FIG. 6B for the special case of azimuth incidence $\phi$ equal 30° and elevation incidence equal zero degrees. The inventors have shown that mathematical expressions for these vector components within the rod lens due to refraction at the dielectric rod surface 50 are given by:

$$v_1 = -\sin_2 \gamma \cos \phi - \cos \gamma \sqrt{\cos^2 \gamma \cos \phi - 1 + N^2}$$
$$v_2 = \tan \gamma (\cos \phi + N v_1)$$
$$v_3 = -\frac{\sin \phi}{N}$$

where N is the index of refraction of the dielectric rod lens 42. In the cross-sectional view of FIG. 6B only the projections 67 A, B in the x-y plane of the vector $\hat{v}$ are shown to represent the rays internal to the lens 42.

To discuss the reflection of rays 67 A, B from the rear mirror surface 51 which rays upon reflection form the reflected rays 52, refer to FIG. 6B. The reflected rays 52 for the edge condition of zero degrees elevation angle incidence generally intersect the x-axis unless they strike the absorber 11 before reflection as can be seen to occur for ray 67B in the bottom portion of the dielectric rod lens 42.

To calculate the x axis intercept 54 of the reflected ray 52 designated as $x_3$ use is made of the following equations employing the angles $\alpha$, $\gamma$, $\gamma'$ and $\beta$ shown in FIG. 6B and the values of the vector components $v_1$ and $v_2$ from equation (2) as follows:

$$\tan \alpha = v2/v1 \quad (3)$$

$$\alpha = \gamma - \gamma' \quad (4)$$

$$\beta = 2\gamma' - \gamma \quad (5)$$

$$\omega = \beta + \gamma' \quad (6)$$

The entering rays 40 incident from the sun on the exterior surface 50 of the rod lens 42 are designated as points:

$$y_e = R \sin \gamma$$
$$x_e = R \sin \gamma \quad (7)$$

Beginning with any entering ray at point $x_e$, $y_e$, one can use equations (2), (3), (4), (5), and (6) to find the points $x_2 y_2$ of incidences of the rays 67A, B on the rear mirror 51 from the equations $$x2 = R \cos \omega \text{ and } y2 = R \sin \omega \quad (8)$$

and then compute the ray intercepts $x_3$ $$x_3 = x_2 - \frac{y2}{\tan \omega} \quad (9)$$

on the x-axis. Given the points $x_2, y_2$ and $x_3, 0$ the rays 52 can be drawn to see if they intercept the absorber 11, generally on the back surface 65. Although the analysis is carried out only in the x-y plane within the dielectric rod lens it can be proven that the z-components, $v_z$, of the internal rays 52 are unchanged upon reflection from the rear mirror 51. The rays 67A, B and 52 all strike the absorber 11 slightly displaced in the axial direction z(when $\phi$ is not zero).

The ray tracing diagram using the above calculating procedure shown in FIG. 6B illustrates x-y components of internal rays 67A, B and 52 when the circular dielectric rod lens has a radius 60, R=1.375 inches and an index of refraction of N=1.523 with elevation incidence angle zero degrees and the azimuth angle incidence $\phi$ equal to 30°. The radial distance 39 between the center of rod lens 73 and the center of the absorber arc is approximately 0.65R. Representative internal rays are drawn for an elevation angle of zero degrees corresponding to one edge of the acceptance angle interval 35. At the other edge of the acceptance angle interval which is 60° higher in elevation angle as shown by line 54 the pattern of ray interception of rays 67A, B and 52 on the absorber 11 will be the same except the rays will now tend to strike the opposite end 60B of the absorber. Throughout the acceptance angle interval 35, and especially in the middle of this angular sector, the internal rays will tend to intercept the absorber 11 primarily on the front surface 63 rather than on the back surface 65.

Because the dielectric to vacuum or gas boundary 14 effects the direction of propagation of rays 67A, B and 52 within the collector this boundary should be either at right angles or parallel to rays at the most critical edge conditions of zero and 60° elevation incidence and zero azimuth incidence. The dashed curve 14 in FIG. 6B illustrates how the contours of this boundary can be made convergent in the zone between the front surface of the absorber 63 and the center of the dielectric rod lens 73. The boundary 14 surrounding the ends of the absorber is made to run approximately parallel to a ray 67A at zero elevation angle incidence and by symmetry of the circular lens at 60° elevation angle incidence also. In general the evacuated or gas filled space 13 should be as large as possible to provide less conduction heat losses from the absorber 11 to the lens 42, to reduce the weight of the collector, and reduce propagation losses through the dielectric material. Shaping of the inner boundary 14 of the dielectric lens 42 will influence the convergence of rays onto the absorber 11 and variation of the contours of this boundary can be made for improving the optics of the collector along with shaping of the rear mirror 51 which is discussed later in this description.

Figure 7:
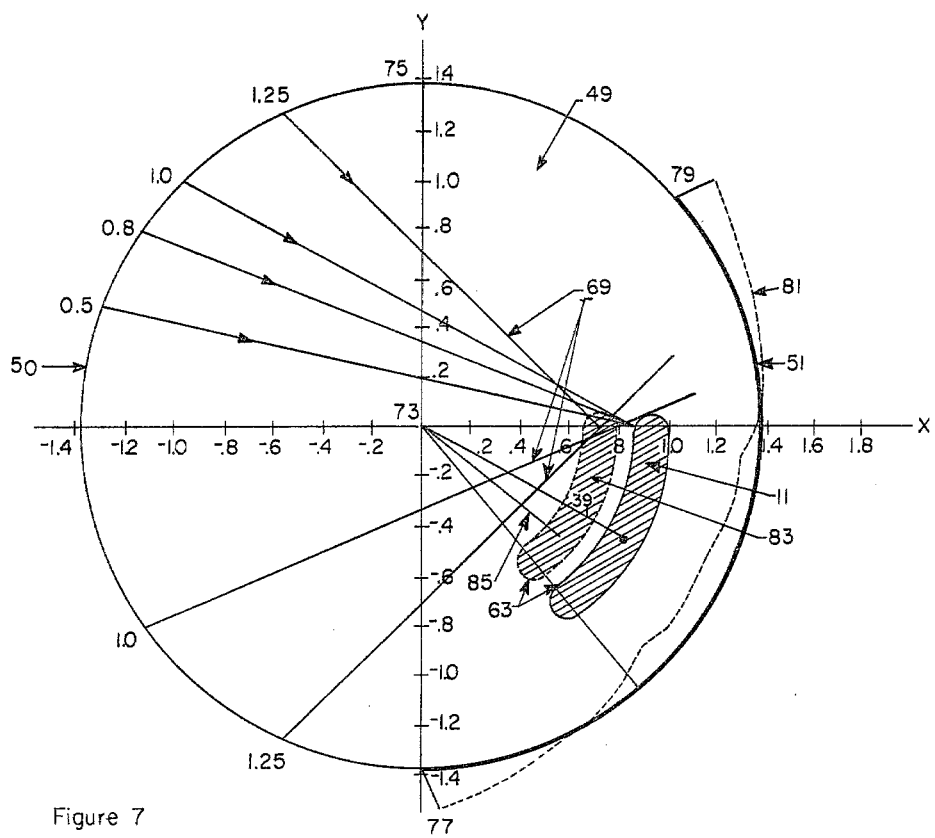
FIG. 7 is an enlarged cross-sectional view of the collector with the shaped internal absorber portion intercepting the sun's rays at the lowest elevation angle and 60° azimuth angle incidence.

In FIG. 7 a ray tracing diagram is shown for the condition of ray incident on the dielectric rod lens at an azimuth angle $\phi = 60°$ and elevation angle equal zero corresponding to an elevation angle edge condition at early morning or late evening positions of the sun for an East-West deployed internal absorber solar collector. For 60° azimuth incidence the internal rays 69 tend to focus onto the front surface 63 of the absorber 11, and they are in the majority incident on the crescent shaped absorber without reflection from the back mirror. It is apparent that the radial distance 39 to the center of the absorber arc which is again drawn at $Ra = 0.65R$ is now too large to intercept all the rays 69. At $\phi = 60°$ the internal absorber 83 can be positioned and shaped as indicated by the dashed curve to improve the optical efficiencies at the edges of the elevation acceptance interval. The radial distance $39 = 0.65R$ is a compromise position for best ray interception over the entire azimuth acceptance angle interval of $\pm 60°$ emphasizing the zero and 60° elevation edge conditions. As both the concentration ratio and thermal loss characteristics are improved by the smaller absorber 83 with a shorter radial distance 85 it is of some value to consider a shape of the rear mirror other than the simple circular shape of rear mirror 51. The rear mirror 81 shown as a dashed curve in FIG. 7 will reflect the internal rays 55 as shown in FIG. 5 onto the end of the absorber 83 as positioned at the shorter radial distance 85 for the edge condition, elevation incidence angle zero, azimuth incidence angle zero. It is seen then that by constructing a non-circular mirror 81 such that reflected rays incident at zero degrees in elevation angle and zero degrees in azimuth are incident on the ends of the absorber 83 at the shorter radial distance 85 improvements in the collector concentration ratio and thermal efficiency can be realized. However, there is a theoretical limit to the maximum value of concentration ratio corresponding to the solid angle acceptance interval which cannot be exceeded. This limit on the concentration ratio is approximately 3.0 for the 60°×120° acceptance angle sector. Using the construction procedure described above the internal absorber rod collector closely approaches this limit on concentration ratio and, at the same time, has nearly 100% optical efficiency in that nearly all rays in the acceptance interval strike the absorber.

Figure 8:
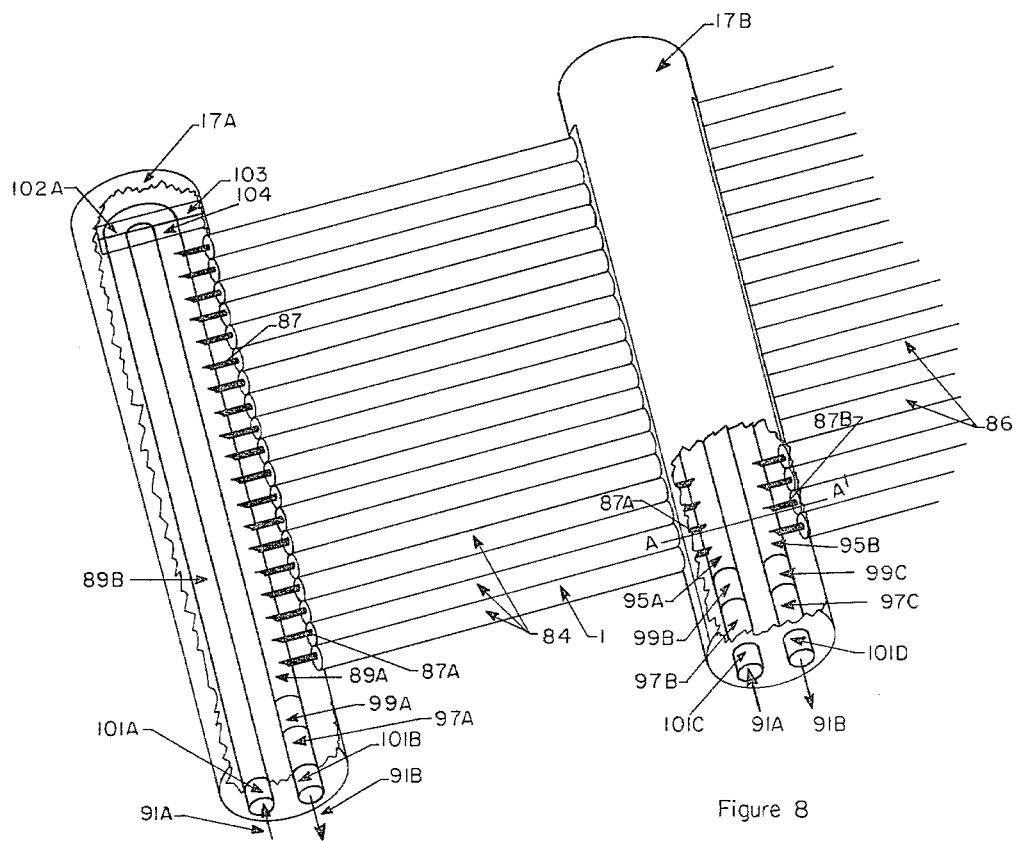
FIG. 8 is a perspective view of the collector with a cut-away section showing end fittings for removing heat from the collector panels.

Referring now to FIG. 8 where is illustrated a novel construction for extracting thermal energy collected from solar radiation by the internal absorber rod collector 1 and collector panels 84 and 86. The cutaway sections of the perspective view drawing show details of end fittings 17A and 17B attached to collector panels 84 and 86. Each internal absorber 87 has a solid metal core of high heat conducting metal which is bonded, usually by soldering, at both ends of metal tubes 89A and 95A through which tubes may flow a liquid circulant in the direction of the arrows 91A and 91B. The heated circulant is generally delivered to a reservoir for use in heat and cooling buildings. End fitting 17A, because it is located on the edge panel 84, has metal absorbers 87 and 87A attached only on one metal tube 89A while the middle located end fitting 17B contains two metal tubes 95A and 95B which are bonded to the solid metal absorbers 87A and 87B connecting collector panels 84 and 86 respectively to end fitting 17B.

To reduce heat losses due to conduction or convection the spaces surrounding the tubes 89A, 89B, 95A, and 95B, and the absorber rods 87, 87A and 87B are filled with a partial vacuum or by transparent low heat conductivity gas. The end fittings 17A and 17B, as well as the collectors and collector panels 84 and 86 must, therefore, be sealed and constructed to prevent gas leaks and liquid leaks. Also the vacuum, gas or liquid seals and boundaries must not be broken due to the expansion and contraction of members as they are heated and cooled. The tubes for liquid circulant 89B, 97A, 97B, 97C and 102A can be constructed of flexible, heat resistant plastic and sealed to the metal tubes 89A, 95A and 95B at the plastic to metal junctions 99A, 99B, 99C and 104. The vacuum or gas seals at 101A, 101B, 101C and 101D are connecting plastic to plastic with the same thermal expansion coefficients and because of the flexibility of tubes 97A, 97B, 97C, 89B and 102 these seals are not stressed greatly due to the thermal expansion and contraction of metal members 89A, 95A, 95B, 87, 87A and 87B. The flexible plastic U-shaped tube 102A and a similar U tube not shown at the remote end of end fitting 17B are loosely held by a plastic or glass clamp 103 so that the U tubes with their attachments can freely move during the expansions and contractions of the metal, plastic or glass portions of the collectors and end fittings.

Figure 9:
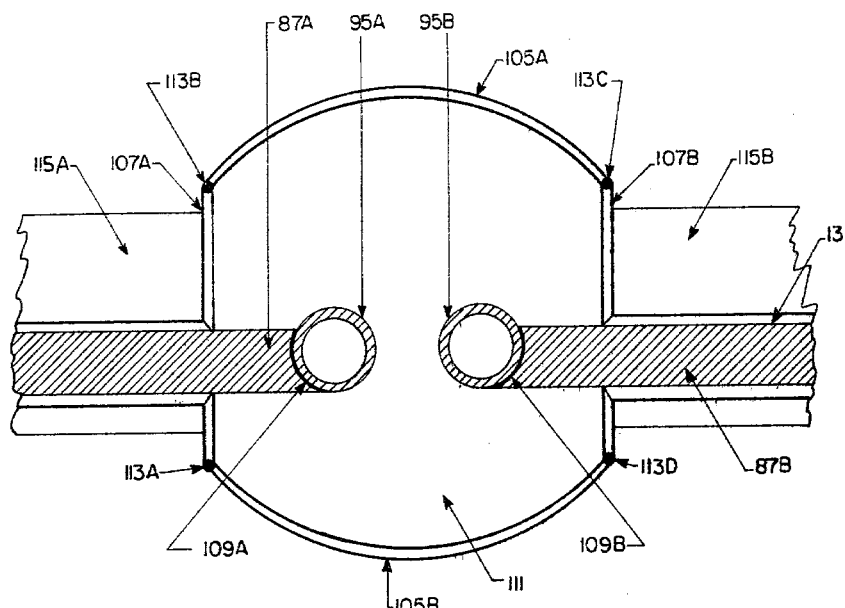
FIG. 9 is an enlarged view of a cross-section taken along the collector rod axis showing details through the end fitting.

In FIG. 9 an enlarged view of a cross-section through end fitting 17B cut along the line A-A' of FIG. 8 is shown to further describe details of construction. The metal tubes 95A and 95B which carry the heated liquid circulant are usually made of copper and soldered to the internal absorber rods 87A and 87B at the junctions 109A and 109B. The curved caps 105A and 105B are usually made of plastic and metalized on the interior surface to reduce radiation losses and are sealed to end plates 107A and 107B along the straight line junctions 113A, B, C, D to allow spaces 111 and 13 to be evacuated. The end plates 107A and 107B are sealed to the ends of the dielectric rod lenses 115A and 115B. The portions 115A and 115B correspond to the dielectric rod lens 15 of FIG. 2 and the internal absorbers 87A and 87B correspond to portion 11 of FIG. 2.

Figure 10:
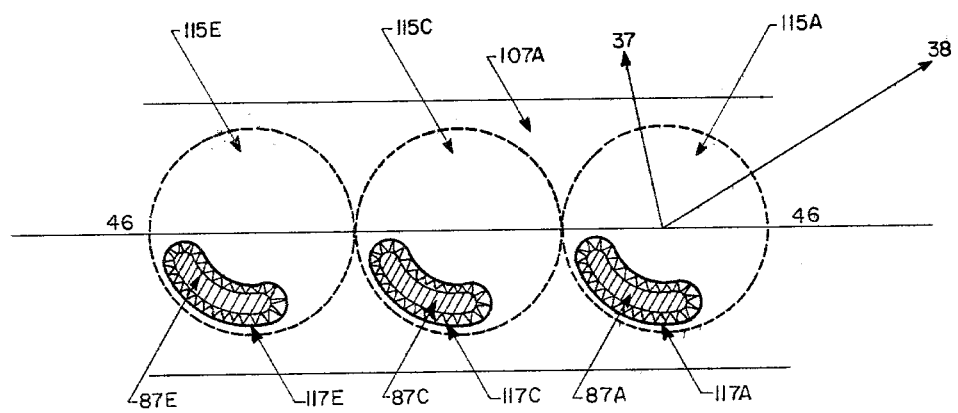
FIG. 10 is an enlarged view of a cross-section normal to the collector rod axes at the end of the rods to illustrate details of end seals and spacers.

In another enlarged cross-sectional view, FIG. 10, the end plate 107A is shown at right angles to several adjacent dielectric rod lenses 115A, C, E and absorber rods 87A, C, E of collector panel 84. In order to position the absorber rods 87A, C, E within the space 13 the end plate 107A is constructed with serrated holes 117A, 117C, and 117E whose teeth loosely touch the crescent shaped absorber rods 87A, C, E. These point contacts between some of the teeth of members 117A, C, E and the ends of absorber rods 87A, C, E reduce conduction heat losses to the glass or plastic dielectric rod lenses and end fittings.

The construction of absorber 87, and the end fittings 93A, B can be simplified to reduce costs of fabrication although some increase in conduction heat losses may result. Referring to FIG. 8 end fitting 17A can be simplified by removing the circulant tube 89B and connecting the metal tube 89A to an additional plastic tube similar to 97A instead of the U-shaped tube 102A. The additional plastic tube like 97A is then passed through an additional hole and similar to seal 101B out the far end of the end fitting 17A. Likewise for end fitting 17B the tube 95B can be removed and the absorbers 87B connected to the opposite side of metal tube 95A. Again, at the opposite end of end fitting 17B from the sealed hole 101C and plastic tube 97B and additional tube 97B is extended through the end fitting 17B with an additional sealed hole 101C. These changes generally require twice as many holes in the building as for the end fittings as shown in FIG. 8 and the excellent insulation of the evacuated or gas filled end fittings 17A, B is not used to reduce heat losses on the return flow of circulant. However cost savings will be made in the construction of the collectors and end fittings as simplified in this way.

Figure 11:
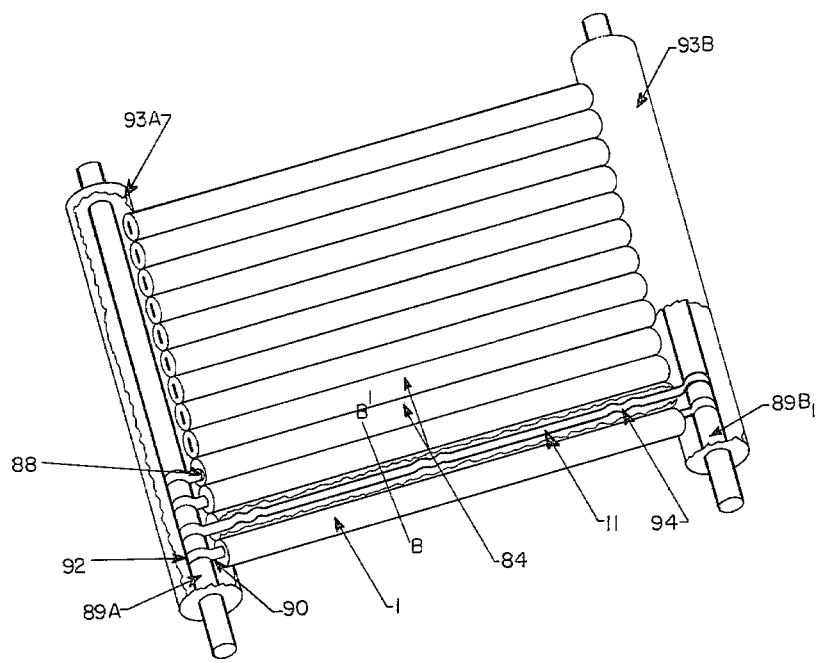
FIG. 11 is a perspective view of collector and collector panel showing simplified construction of absorber and end fittings.
Figure 11A:
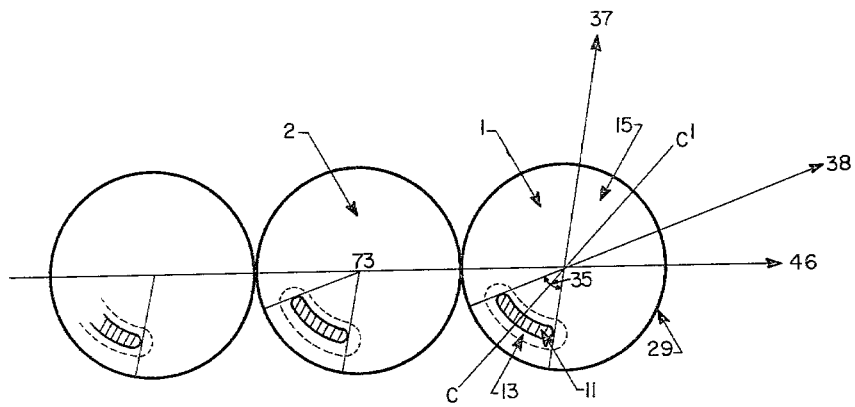
FIG. 11A is an enlarged cross-sectional view of the simplified collector showing absorber as a flat metal ribbon.
Figure 11B:
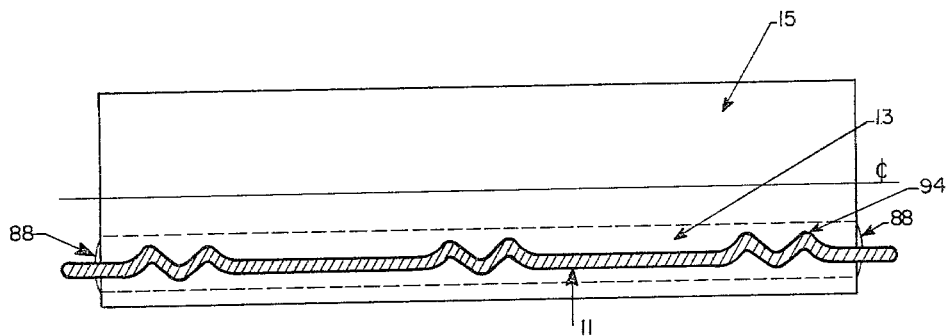
FIG. 11B is an enlarged view of a longitudinal section through the simplified collector showing undulations in the absorber ribbon.

Another important simplification in the construction of the solar collector and collector panels is illustrated in the perspective drawing of FIG. 11. In the cut away section vacuum or gas seals 88 are shown at the collector ends connecting the metal absorber 11 with the dielectric rod lens 15. To allow for expansion and contraction of the absorber, undulations 94 are made in the absorber as several positions along its length. This wavy construction of the solid metal absorber gives the structure the characteristics of a spring and allows the ends of the absorber at the position of the seals 88 to be more or less fixed while the absorber rod changes length with changes in temperature. With this construction each collector 1 as modified is a sealed unit and in case it is broken the vacuum to the other collectors in the panel 84 is not disturbed. These collectors can be rotated and assembled in panels for different latitudes and mounting surfaces. The details shown in FIG. 11A which is an expanded cross-sectional view cut through a collector perpendicular to the collector axis 73 as shown by line marked B-B' in FIG. 11. When the panel axis 46 is as shown, collectors 1 and 2 can be rolled until the absorber angular interval 35 corresponds with the angular interval given by the maximum elevation angle 38 of the sun and the lowest usable elevation angle of the sun 37. When the individual collector units are rolled to the desired angular position the rear mirror 29 can be constructed by, for example, spraying or dipping the back surface of this dielectric rod lens 15 with silver paint. To attach the ends of the absorbers beyond the seal 88 to the metal circulant tube 89A a twist 90 is bent into the absorber rod such that the end of the absorber can be bent as a flat member 92 concentric to the metal tube 89A as shown in FIG. 11. The metal absorber in this form provides a large surface area contact with the circulant tubes 89A and 89B, where it can be bonded by soldering or welding for good heat conduction. The end fittings 93A and 93B can be insulated using vacuum or low conducting gas as illustrated in FIG. 8 or simply constructed of insulating tubes of foam or fiber glass. In order to simplify the formation of the undulations 94 the absorber 11 is constructed as a flat or nearly flat ribbon of metal with black selective absorber on its surface. A longitudinal cut taken on the line C-C' shown in FIG. 11A is shown in FIG. 11B. The space 13 is typically evacuated and the undulation 94 will tend to center the absorber 11 within the space 13.

Making these simplifications in the construction will result in additional conduction heat losses at the lens to absorber seals 88 and at points where the undulations 94 touch the dielectric lens. However, the flattened ribbon shaped absorber with undulations will tend to miss some rays that would be intercepted by the crescent shaped or arced absorber 11. The cost savings in manufacturing and the advantage in sealing each collector individually so that leakage or breakage of a single collector will not adversely effect the entire collector panel can make these simplifying modifications feasible.

To summarize the technical description of the internal absorber rod collector and solar panels, it was illustrated in FIGS. 1, 2 and 3 how to construct and mount the collectors on vertical walls, roof tops and flat surfaces. The optical characteristics of the dielectric rod lens with circular or shaped rear mirror were described with the aid of FIGS. 4, 5, 6A, 6B and 7 which result in the very high efficiency concentration of solar radiation onto the internal rod absorber over an acceptance interval of 60° in the elevation plane and ±60° in the azimuth plane without tracking motions of the collector. The detailed construction of the collectors and their end fittings to reduce thermal losses and to prevent the breaking of vacuum and liquid seals due to thermal expansion or contraction of collector portions was described with reference to FIGS. 8, 9, 10, 11, 11A and 11B.

To illustrate the high thermal efficiencies realizable using very small diameter dielectric rod lenses and circular rear mirrors with solid metal internal absorbers for collecting solar radiation and conducting the thermal energy to the ends of the collector the following numerical example is provided. Refer again to FIG. 6B for aid in describing the dimensions of the collector used in the example calculations of thermal efficiencies which calculations assume that all thermal losses except heat radiation from the shaped absorber rods can be neglected. The radius R, 60, of the right circular cylinder dielectric rod lens 42 was assumed to be $\theta.25$ inches. The radial distance r, from the central axis 73 of the dielectric rod lens to the inner surface 63 of the selectively coated solid copper absorber 11 was varied in the calculations and given by the expression: $r_1 = \rho_1 R$. Likewise, the radial distance from the center 73 of the dielectric rod lens to the outer surface 65 of the absorber 11 was varied and given by the expression: $r_2 = \rho_2 R$. The acceptance elevation angle or arc 35 was fixed at 60°. Thus, the width 34 and thickness 33 of the absorber 11 could be determined for the cases tabulated. In addition it was assumed that the infra red emissivity of the surfaces 63 and 65 of the absorber rod 11 or 87A of FIG. 8 was taken to be $\theta.15$ and the temperature of the circulant tubes 89B, 95A and 95B of FIG. 8 and the fluid within them was fixed at 200° F. The end-to-end lengths of the absorber rod 87A was given values of 6, 12 and 18 inches, which correspond to the width of collector panel 84 and the distance between the end-fittings 17A and 17B of FIG. 8. Also, the solar energy incident on dielectric rod lens 42 of FIG. 7B was assumed to be constant at 221 Btu/ft$^2$/hr and the thermal conductivity through the solid copper absorber was assumed to be 216 Btu/(hr. ft. F).

TABLE 1

Heat flux, efficiency, and maximum rod temperature for varying values of L, $P_1$, and $P_2$.

| L (inches) | $P_1$ | $P_2$ | Thickness (inches) | Heat Flux (btu/hr) | Efficiency (fraction) | $T_{max}$ (°F.) |
|---|---|---|---|---|---|---|
| 6 | 0.63 | 0.74 | 0.0275 | 3.714 | 0.807 | 231 |
| 6 | 0.63 | 0.85 | 0.0550 | 3.652 | 0.793 | 214 |
| 6 | 0.50 | 0.85 | 0.0875 | 3.672 | 0.797 | 210 |
| 6 | 0.63 | 0.90 | 0.0675 | 3.609 | 0.784 | 211 |
| 6 | 0.63 | 0.70 | 0.0175 | 3.696 | 0.803 | 250 |
| 6 | 0.63 | 0.675 | 0.0112 | 3.628 | 0.788 | 277 |
| 12 | 0.63 | 0.74 | 0.0275 | 6.775 | 0.736 | 310 |
| 12 | 0.63 | 0.85 | 0.0550 | 6.978 | 0.758 | 253 |
| 12 | 0.50 | 0.85 | 0.0875 | 7.121 | 0.773 | 238 |
| 12 | 0.63 | 0.675 | 0.0112 | 5.766 | 0.626 | 425 |
| 12 | 0.50 | 0.90 | 0.1000 | 7.053 | 0.766 | 232 |
| 18 | 0.63 | 0.74 | 0.0275 | 8.670 | 0.628 | 400 |
| 18 | 0.63 | 0.85 | 0.0550 | 9.658 | 0.699 | 308 |
| 18 | 0.50 | 0.85 | 0.0875 | 10.12 | 0.733 | 280 |
| 18 | 0.50 | 0.90 | 0.1000 | 10.09 | 0.731 | 267 |
| 18 | 0.63 | 0.675 | 0.0112 | 6.386 | 0.462 | 520 |

In Table 1 are tabulated the heat flux delivered at the two ends of the collector 1 and the collector efficiency as the heat delivered at the ends of the absorber rod 87A of FIG. 8 divided by the total heat incident on the collector rod 1. Efficiencies of approximately 75% are calculated for appropriate selections of absorber rod 11 width given by $$\text{width} = \theta \frac{(r1 + r2)}{2}$$

and thickness $= r_2 - r_1$ and lengths L.

The maximum temperature of the rod absorber due to solar heating will occur at its midpoint under the conditions of operation assumed. Values of the maximum temperature Tmax are also tabulated in Table 1.

MODIFIED FORM FOR HEAT EXTRACTION

It has been shown that heat extraction from the internal absorber rod collector can be done efficiently by thermal conductivity of the absorber itself. This discovery makes it possible to construct collector panels that are thin, for example, from miniature collector rods, ½ inch diameter. The concentration ratio of all collectors including the dielectric rod lens with subreflect is limited to approximately 3 when the acceptance angle is an internval 60° in elevation angle by 120° in azimuth angle as required for efficient non-tracking solar collectors. However, when the absorber structure is segmented such that illuminated and heated parts of the absorber are thermally insulated from non-heated portions then higher concentration ratios are possible which can result in better collector efficiencies because the surface area of the heated portions of the collector is reduced. Smaller hot surface areas mean less thermal radiation losses and higher collector efficiencies.

Figure 12:
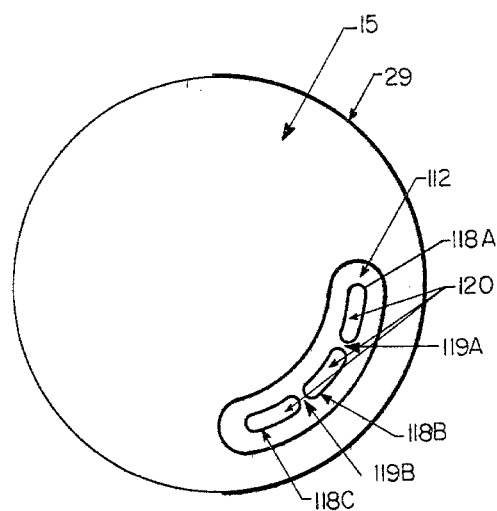
FIG. 12 is an enlarged cross-sectional view of the collector showing segmented tubular absorbers.
Figure 13:
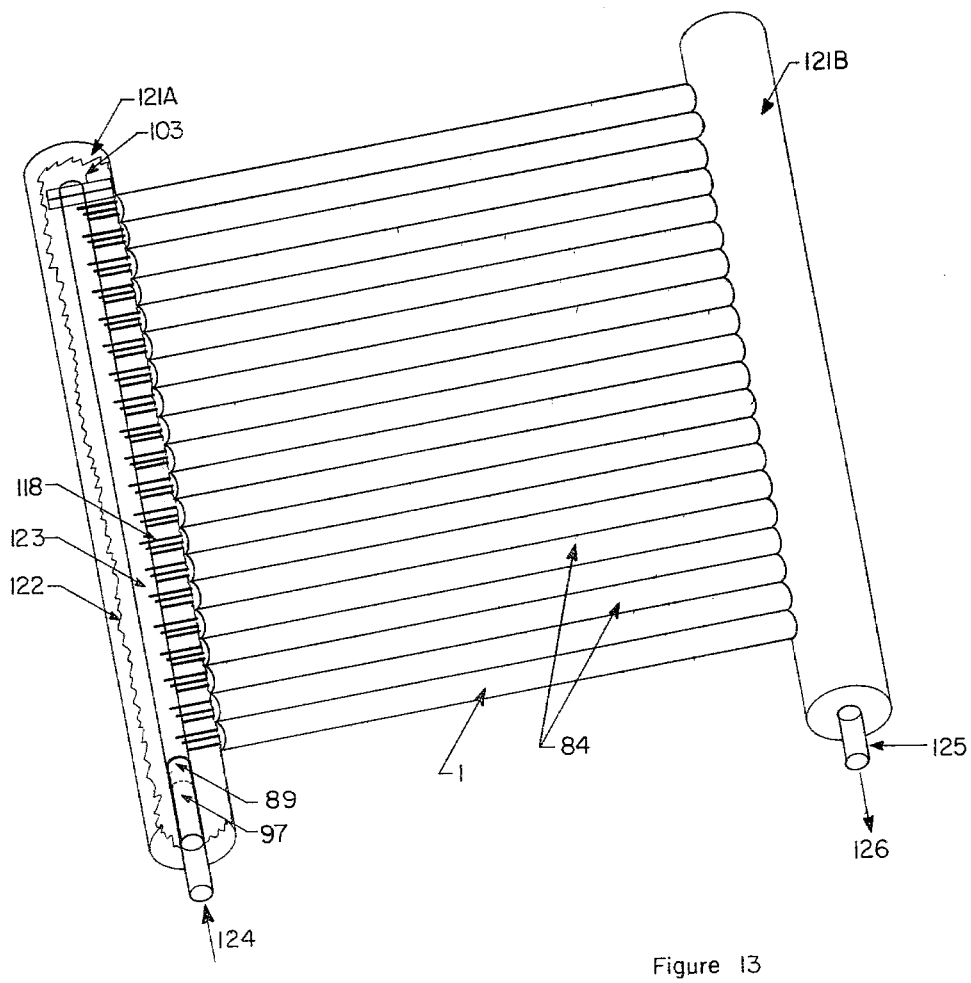
FIG. 13 is a perspective view of a modified form of the collector panel with a cut-away portion of the end fittings showing segmented tubular internal absorbers.

A novel construction will now be described for modifying the absorber and heat collection portions of the internal absorber rod collector in order to obtain higher collector efficiencies and higher concentration ratios. Referring to FIG. 12 the absorber has been segmented into three portions 118A, 118B, 118C, although more or less segments can be used depending on concentration ratio desired. The absorber segments 118A, B, C are again coated on their exterior surfaces with a selective absorber such as black chrome and they are separated from each other by small thermal insulating gaps 119A and 119B. The absorber segments are now hollow metal tubes constructed of, for example, copper or aluminum with interior portions 120 filled with oil whose viscosity is temperature dependent such that when heated the viscosity is decreased in the range of temperatures from 70° F. to 500° F., for example. In order to permit flow of oil through the absorber without excessive wall friction the diameter of the dielectric rod lens 15 and the radius of curvature of the rear mirror 29 are generally increased in comparison with dimensions of the internal absorber rod collector when employed with solid rod absorbers using heat conductivity for heat removal. Because of the scaling properties of the interval absorber rod collector the optical characteristics are unchanged from those already described. However, because the collector diameter has been increased the weight per unit area of the collector panels has also been increased. The operation of the internal absorber collector 1 as modified for attaining higher concentration ratio by segmented absorber 118 carrying temperature dependent viscosity oils is seen in FIG. 13 showing a panel 84 of collector. The end fitting 121A has a cutaway section 122 in which the end clamp 103, flexible plastic tube 97 and plastic tube to metal tube seal 89 are similar to those shown in FIG. 8 wherein heat is extracted by conductivity in a solid unsegmented rod absorber. However, now the end fittings 121A and 121B contain only one metal tube 123 which contains oil under pressure which flows in the direction of arrow 124 through plastic tube 97 and metal tube 123 into the segmented absorber tubes 118A, B, C filling the portions 120. When, for example, in the winter season absorber segment 118A is illuminated most of the day and segments 118B and 118C are illuminated very little due to the low elevation angles of the sun, then the temperature dependent viscous oil will flow primarily in segment 118A due to pressure of the oil in the end fitting 121A toward the tube 125 in the direction of the arrow 126. Absorber portions 118B and 118C not being heated by the sun will contain oil of higher viscosity and, therefore, allow relatively little of the cooler oil from tube 123 to pass through the collector panel 84 to end fitting 121B and from thence through tube 125.

Although the construction for increasing concentration ratios for improving collector efficiencies and higher operating temperatures has been illustrated as a modification to the internal absorber rod collector, the same improvements in performance can be realized for any solar collector with focal zone that can be segmented into thermally insulated portions in which temperature dependent viscosity fluids or gases are flowing.

Those skilled in the art of solar collectors will recognize or be able to ascertain using no more than routine experimentation, many equivalents to the specified elements described herein. Such equivalents are intended to be comprehended by the following claims.

What is claimed is:

1. Apparatus for collecting heat produced by solar energy comprising:
    a panel of non-tracking solar collectors arrayed side by side, each solar collector having
    a dielectric rod-shaped lens within which is located, in a portion of the lens remote from the directions of solar incidence on the solar collector, a blackened absorber member having a crescent shaped cross section along a substantial length thereof so positioned with the rod-shaped lens to absorb substantial solar radiation through daily and annual variations in direction of the incident solar energy, the absorber being surrounded by a space filled with an insulating, transparent gas of very low thermal conductivity, a portion of the outer surface of the rod-shaped lens situated generally on the opposite side of the rod-shaped lens from the directions of solar incidence being covered by a reflecting mirror, and at the ends of the solar collector which correspond to the ends of the rod-shaped lens axis, end fittings for the purpose of extracting and removing heat collected by the solar collector and conveyed to the ends of the solar collector.

2. Apparatus for collecting heat produced by solar energy comprising:

a panel of solar collectors arrayed side by side, each solar collector having a dielectric rod-shaped lens within which is located, in a portion of the lens remote from the directions of solar incidence on the solar collector, a blackened absorber member surrounded by a space filled with an insulating, transparent gas of very low thermal conductivity and a portion of the outer surface of the rod-shaped lens, situated generally on the opposite side of the rod-shaped lens from the directions of solar incidence is covered by a reflecting mirror and, at the ends of the solar collector which corresponds to the ends of the rod-shaped lens axis are provided end fittings for the purpose of extracting and removing heat collected by the solar collector and conveyed to the ends of the solar collector and each said solar collector being so constructed and so oriented in relation to solar incidence that more than 90% of the radiant solar energy incident on a fixedly mounted solar energy panel over an acceptance angle interval of 60° in an elevation plane and 120° in orthogonal azimuth planes is intercepted by the blackened absorber member while under the same circumstance of solar incidence the collector concentration ratio is less than 4.

3. Apparatus according to claim 2 wherein the outer surface of said dielectric rod-shaped lens has the approximate form of a right circular cylinder and the index of refraction of the rod-shaped lens is nearly homogeneous and can have values between 1.3 and 3 and said reflecting mirror which is attached to the rear surface of the rod-shaped lens is also nearly circular in form.

4. Apparatus according to claim 2 wherein said blackened absorber member having a crescent shaped cross-section comprises a solid metal rod lying parallel to and to one side of the axis of the dielectric rod-shaped lens and whose outer surface is covered by a selectively absorbing coating and the thickness, width and length of said blackened absorber member are constructed such that 70% of the radiant solar energy intercepted by the blacked absorber is conveyed by thermal conduction to the ends of the absorber rod when the blackened absorber member is located within the dielectric rod-shaped lens and surrounded by a zone of insulating gas through which conduction losses to the dielectric rod-shaped lens are negligible.

5. Apparatus according to claim 2 in which said end fittings connect the ends of solar collectors arrayed in solar panel to metal tubes carrying liquid circulant onto which tubes the ends of said blackened absorber portions are thermally bonded, and said metal tubes and the blackened absorber members being generally separated from the dielectric rod-shaped lenses and from cover portions of the end fittings by a space filled with low thermal conductivity gas in which space the blackened absorber portions and tubes carrying liquid circulants are free to move such that the movements due to the expansion and contraction of heated and cooled portions of the collector do not break allowing the leakage of gases and/or liquids from the solar collector.

6. Apparatus according to claim 2 in which said blackened absorber member being composed of solid flexible metal of high thermal conductivity and covered on its outer surface with a selectively absorbing layer is constructed in the form of a flat ribbon which at intervals along its length are bent elastic undulations which permit the ends of the blackened absorber to be held in a fixed position while portions of the blackened absorber move due to thermal expansion and contraction of the blackened absorber member, and the blackened absorber containing said elastic undulations is connected at each end to said dielectric rod-shaped lens by a vacuum seal to prevent the flow of gas into or out of the space surrounding the blackened absorber member.

7. Apparatus according to claim 6 wherein the ends of said blackened absorber which extend beyond the dielectric rod-shaped lens and the vacuum seals into the end fitting being in the form of flat metal ribbons from which the selectively absorbing surface layer has been removed are thermally bonded to and curved around a metal circulant tube within the end fittings which metal tube is oriented approximately at right angles to the axis of the dielectric rod lens, and said ends of the flat absorber ribbon are twisted in the region between said vacuum seal and the curved metal bond in order to rotate the solar collector about the axis of the dielectric rod-shaped lens for the purpose of adjusting the angular inclination of the solar panel surface for different installations.

8. Apparatus according to claim 2 wherein said reflecting mirror attached to the rear surface of each dielectric rod-shaped lens is non-circular in form and is shaped such that the solar incidence from directions at the extreme upper and extreme lower boundaries of the elevation angle acceptance interval, after transmission through the dielectric rod-shaped lens and reflection from the shaped mirror, is concentrated at or near the edges of said blackened absorber member.

9. Apparatus according to claim 8 wherein said dielectric rod-shaped lens has a radius of less than 0.25 inches and wherein the blackened absorber with surrounding insulating space, the reflecting mirror are proportionately reduced in size to maintain a collector concentration ratio of less than 4.

10. Apparatus according to claim 2 wherein said panel of solar collector is fixedly mounted on a vertical wall with each solar collector being rotated with respect to the panel surface such as to maintain a collector optical efficiency of 90% or greater and a solar concentration ratio of approximately 3 over a 60 degree by 120 degree acceptance angle interval.

11. Apparatus according to claim 2 wherein said panel of solar collectors and end fitting are mounted with brackets onto a fixed structure and connected by insulated tubes to a reservoir containing liquid heated by circulation through the end fittings of the collector which reservoir is located above the panel of solar collectors such that the action of gravity on the liquid heated by the solar collectors produces a flow of liquid in and out of the reservoir.

12. Apparatus according to claim 2 wherein said panel of solar collector is fixedly mounted on a roof top with each solar collector being rotated with respect to the panel surface such as to maintain a collector optical efficiency of 90% or more and a solar concentration ratio of approximately 3 over a 60 degree by 120 degree acceptance angle interval.

13. Apparatus according to claim 2 wherein said blackened absorber member is segmented by dividing it into several absorber strips lying more or less parallel to the axis of the dielectric rod shaped lens each absorber strip being covered over its outer surface by a layer of selectively absorbing material and separated from neighboring absorber strips by narrow insulating strips, and said absorber strips being constructed of metal tubes within which flows viscous oils whose viscosity reduces when heated such that the viscous oil which enters the solar collector under pressure from one end fitting passes more freely through the absorbers having the greater solar illumination than the other absorbing strips of the solar collector.

* * * * *